United States Patent
D'Agostino

(10) Patent No.: US 11,790,012 B2
(45) Date of Patent: *Oct. 17, 2023

(54) SYSTEM AND METHOD FOR TAGGING DATA

(71) Applicant: The Toronto-Dominion Bank, Toronto (CA)

(72) Inventor: Dino Paul D'Agostino, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,646

(22) Filed: Jun. 29, 2022

(65) Prior Publication Data
US 2022/0358415 A1 Nov. 10, 2022

Related U.S. Application Data

(63) Continuation of application No. 16/717,029, filed on Dec. 17, 2019, now Pat. No. 11,409,811.

(51) Int. Cl.
*G06F 16/908* (2019.01)
*G06N 20/00* (2019.01)
*G06N 20/20* (2019.01)
*G06F 9/54* (2006.01)
(Continued)

(52) U.S. Cl.
CPC ............ *G06F 16/908* (2019.01); *G06F 9/547* (2013.01); *G06F 18/214* (2023.01); *G06N 20/00* (2019.01); *G06N 20/20* (2019.01); *G06Q 20/389* (2013.01)

(58) Field of Classification Search
CPC ...... G06F 9/547; G06F 18/214; G06F 16/908; G06N 20/20; G06Q 20/389
See application file for complete search history.

(56) References Cited

U.S. PATENT DOCUMENTS 8,275,666 B2 9/2012 Chang et al.
8,442,881 B2 5/2013 Patel
8,831,677 B2 9/2014 Villa-Real
(Continued)

OTHER PUBLICATIONS

Ravendran, R. et al.; "Online Banking Customization via Tag-based Interaction"; http://ceur-ws.org/Vol-817/paper2.pdf; published at least as early as Jul. 16, 2019.

(Continued)

*Primary Examiner* — William Spieler
(74) *Attorney, Agent, or Firm* — CPST Intellectual Property Inc.; Brett J. Slaney

(57) ABSTRACT

A system and method are provided for tagging data. The method is executed by a device having a communications module and includes providing, via the communications module, to a client device, an option to associate tags with an event, the option enabling a tag to be selected, created, or customized to add context to the event. The method also includes receiving via the communications module, from the client device, tagged data added by the client device, associating the tagged data with the event, and storing the tagged data in a database of tagged data from a plurality of client devices, the database of tagged data being associated with a plurality of events. The method also includes using the database of tagged data to generate or train an associative model, and using the associative model to generate at least one suggested tag based on associations between the plurality of client devices.

20 Claims, 10 Drawing Sheets

(51) Int. Cl.
    *G06Q 20/38*     (2012.01)
    *G06F 18/214*     (2023.01)

(56) References Cited

U.S. PATENT DOCUMENTS

| | | |
|---|---|---|
| 10,204,380 B1 | 2/2019 | Moore et al. |
| 2009/0276346 A1 | 11/2009 | Rukonic et al. |
| 2016/0125317 A1 | 5/2016 | Benjamin |
| 2018/0236255 A1 | 8/2018 | Etkin |
| 2018/0285773 A1 | 10/2018 | Hsiao et al. |
| 2018/0300608 A1 | 10/2018 | Sevrens |
| 2019/0108440 A1 | 4/2019 | Adib et al. |
| 2019/0108593 A1 | 4/2019 | Yadav et al. |
| 2019/0172117 A1 | 6/2019 | Sharma |
| 2019/0205993 A1 | 7/2019 | Rodriquez et al. |
| 2019/0266354 A1 | 8/2019 | Banerjee |
| 2020/0082000 A1 | 3/2020 | Sudheendra |

OTHER PUBLICATIONS

Zoho Books—Reporting Tags; https://www.zoho.com/in/books/help/settings/reporting-tags.html; published at least as iarly as Jul. 16, 2019.

"Tagging your bank transactions—Quickfile"; https://community.quickfile.co.Uk/t/tagging-your-bank-transactions/8818; Apr. 26, 2019.

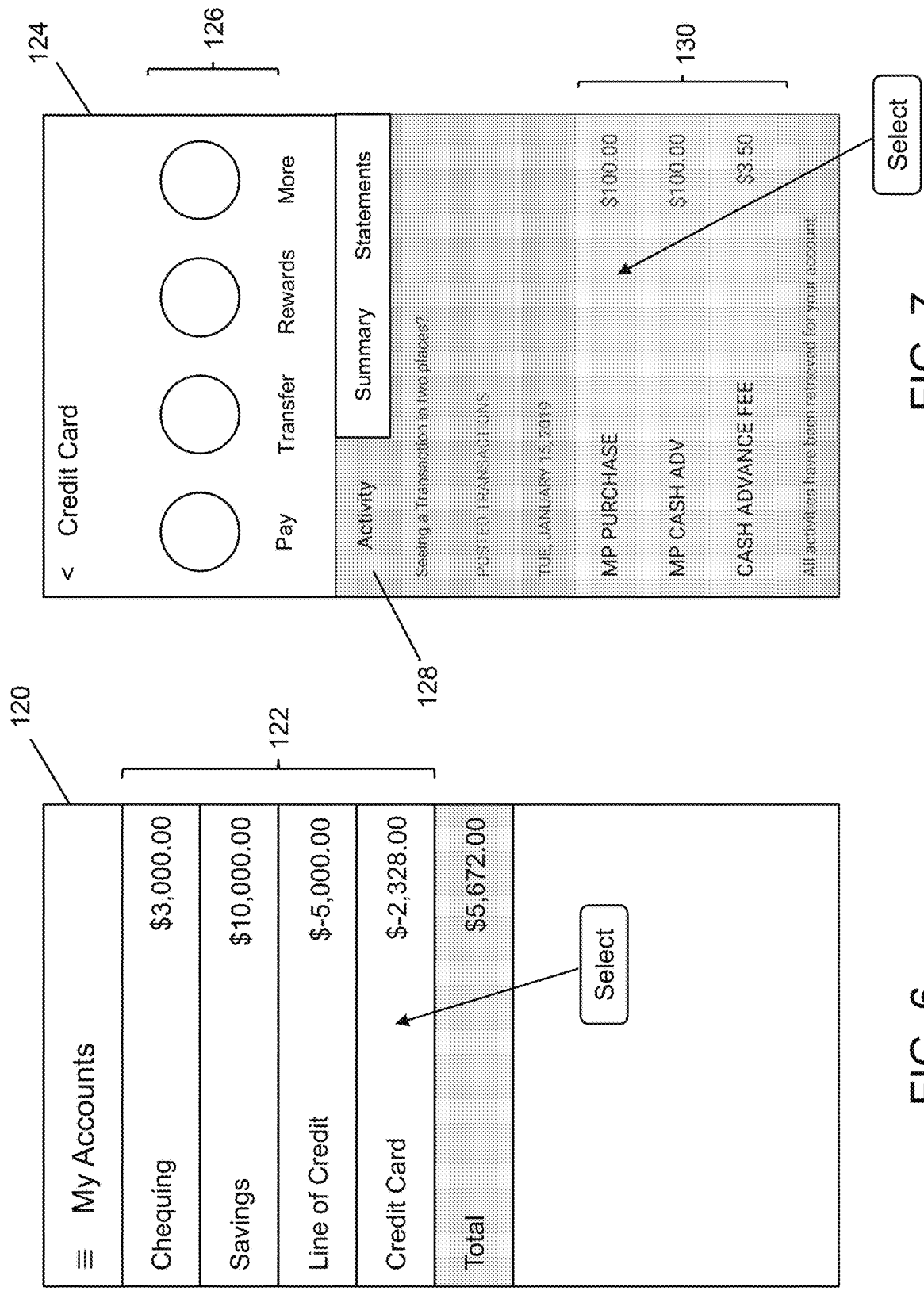

SYSTEM AND METHOD FOR TAGGING DATA

CROSS-REFERENCE TO RELATED APPLICATIONS

This application is a Continuation of U.S. patent application Ser. No. 16/717,029 filed on Dec. 17, 2019, the entire contents of which is incorporated herein by reference.

TECHNICAL FIELD

The following relates generally to tagging data.

BACKGROUND

Events or actions, such as financial transactions, may be recorded or captured as entries in a statement, log, ledger, table, or list. Often, such events or actions are associated with an account associated with a user and that user can access the statement, log, ledger, table, or list in a graphical user interface provided through a web browser login, application (app) or both.

For example, account information for certain types of financial products (e.g., a chequing or savings account, a line of credit, or a credit card) may include a transaction history and can capture events that occur within a period of time, e.g., through monthly statements. Typically, the transaction history provides limited information associated with the transaction, such as the location at which a purchase was made and the amount paid for that purchase. Moreover, a vendor's billing name may be unrecognizable (e.g., a numbered corporation) and it can be difficult to recall what was actually purchased based on the date and amount alone. This can cause confusion between legitimate and fraudulent transactions.

When reviewing a transaction history or other logs of events, such limited information can make it difficult to recall why a purchase was made, or to recall other contextual information about the individual entries.

BRIEF DESCRIPTION OF THE DRAWINGS

Embodiments will now be described with reference to the appended drawings wherein:

FIG. 6 is an example of a graphical user interface for an accounts summary page of a financial institution application.

FIG. 7 is an example of a graphical user interface for an account details page of a financial institution application.

DETAILED DESCRIPTION

Figure 1:
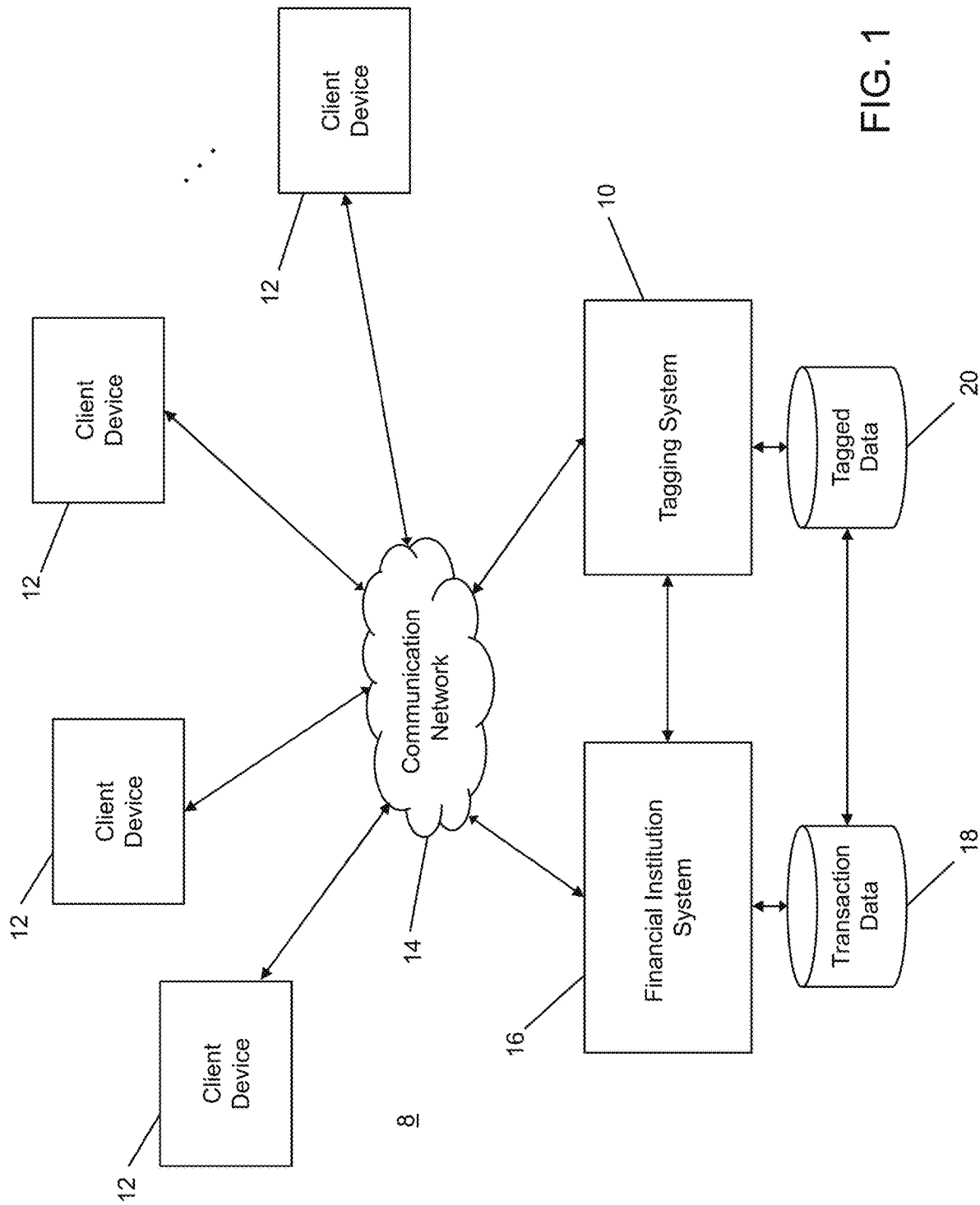
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

When provided with a transaction history having limited associated information, it can be difficult to recall why a purchase was made or other contextual information about the individual entries. That is, while a transaction entry in a transaction history or statement provides some identifying information, the user typically does not have access to, or a way to augment, this limited information with additional information, notes, or other useful content. Such additional content would be advantageous for organizing financial data, conducting searches associated with the financial data, and determining associations between users, entities, products, locations, services and other elements.

A system is described herein that enables users to add notes and/or custom tags to transactions. For example, the transaction history page of a mobile app can provide "Notes" and "Tags" tabs to enable the user to add a note, include a link (to another location), attach a file, or otherwise augment the transaction history with additional information and content they may wish to see later. The financial institution system can also benefit from modeling the content, preparing associations, and improving search functions. That is, the tagged data can provide context to a transaction and can be modeled and used for advanced features such as deep searching, e.g., to inform other features in the appl. For example, Word2Vec models (i.e., a group of related models that are used to produce word embeddings—shallow, two-layer neural networks that are trained to reconstruct linguistic contexts of words) can be built and such a model can be trained using the tagged data to generate user-built associations.

In another aspect, the presently described system can enhance the user-built tags (and associations inferred from them) by providing a "people like you" capability, which allows the user to quickly and conveniently tag a transaction based on a suggestion related to how people like that user have tagged a similar transaction. The associative model used for such a feature can then be trained using the "people like you" tag added by the user.

It will be appreciated that while examples provided herein are directed to financial transactions and financial histories and statements, the principles discussed herein equally apply to other events or actions, such as user or data activity logs, access control logs, mobile phone statements, utility consumption statements, etc.

Certain example systems and methods described herein are able to tag data and/or facilitate the tagging of data. In one aspect, there is provided a device for tagging data. The device includes a processor, a communications module coupled to the processor, and a memory coupled to the processor. The memory stores computer executable instructions that when executed by the processor cause the processor to provide via the communications module, to a client device, an option to associate tags with an event, the option enabling a tag to be selected, created, or customized to add context to the event. The memory also stores computer executable instructions that when executed by the processor cause the processor to receive via the communications module, from the client device, tagged data added by the client device, associate the tagged data with the event, and store the tagged data in a database of tagged data from a plurality of client devices, the database of tagged data being associated with a plurality of events. The memory also stores computer executable instructions to cause the processor to use the database of tagged data to generate or train an associative model; and use the associative model to generate at least one suggested tag based on associations between the plurality of client devices.

In another aspect, there is provided a method of tagging data. The method is executed by a device having a communications module. The method includes providing, via the communications module, to a client device, an option to associate tags with an event, the option enabling a tag to be selected, created, or customized to add context to the event. The method also includes receiving via the communications module, from the client device, tagged data added by the client device, associating the tagged data with the event, and storing the tagged data in a database of tagged data from a plurality of client devices, the database of tagged data being associated with a plurality of events. The method also includes using the database of tagged data to generate or train an associative model and using the associative model to generate at least one suggested tag based on associations between the plurality of client devices.

In another aspect, there is provided non-transitory computer readable medium for tagging data. The computer readable medium includes computer executable instructions for providing, via a communications module, to a client device, an option to associate tags with an event, the option enabling a tag to be selected, created, or customized to add context to the event. The computer readable medium also includes computer executable instructions for receiving via the communications module, from the client device, tagged data added by the client device, associating the tagged data with the event, and storing the tagged data in a database of tagged data from a plurality of client devices, the database of tagged data being associated with a plurality of events. The computer readable medium also includes computer executable instructions for using the database of tagged data to generate or train an associative model and using the associative model to generate at least one suggested tag based on associations between the plurality of client devices.

In certain example embodiments, the device can provide via the communications module to the client device or another client device, the at least one suggested tag for use with the option to associate tags. One or more of the at least one suggested tag can indicate that users like a user of the client device have tagged similar events using the suggested tag.

In certain example embodiments, the option to associate tags can display a plurality of existing tags on a display screen of the client device. At least one of the plurality of existing tags is a suggested tag.

In certain example embodiments, the database of tagged data can be made available to a searching function. The searching function can be used by an application used to display information associated with events. The searching function can be used by an application separate from an application used to display information associated with events. The model can be trained using data determined from use of the searching function to create the associations.

In certain example embodiments, the model can be trained using data associated with the event. The data associated with the event can be obtained from at least one of: an existing event description, and a user-generated association generated through use of the option. The data associated with the event can be obtained from a transaction receipt.

In certain example embodiments, training the model can include building a group of related models that are used to produce word embeddings.

FIG. 1 illustrates an exemplary computing environment 8. In one aspect, the computing environment 8 may include a tagging system 10, one or more client devices 12, and a communications network 14 connecting one or more components of the computing environment 8.

The computing environment 8 may also include a financial institution system 16 (e.g., a commercial bank) that provides financial services accounts to users and processes financial transactions associated with those financial service accounts. While several details of the financial institution system 16 have been omitted for clarity of illustration, reference will be made to FIG. 3 below for additional details.

The financial institution system 16 includes or otherwise has access to a datastore for storing transaction data 18. The tagging system 10 includes or otherwise has access to a datastore for storing tagged data 20. The tagged data 20 may include any information or content, such as metadata, tags, notes, files (e.g., PDFs), links (e.g., URLs), images, videos, etc. that has been associated with a particular transaction entry. As such, the tagged data 20 can be mapped to the transaction data 18. The transaction data 18 may include both data associated with a user of a client device 12 that interacts with the tagging system 10 and financial institution system 16 (e.g., for participating in mobile banking) and transaction history data that is captured and provided with a transaction entry, e.g., in the graphical user interface of a mobile or web-based banking application. The data associated with a user can include client profile data that may be mapped to corresponding financial data 68 (see FIG. 3) for that user and/or may include some of the financial data 68. It can be appreciated that the financial data 68 shown in FIG. 3 could also include the transaction data 18 shown in FIG. 1 and these datastores are shown separately for illustrative purposes. The client profile data can include both data that is associated with a client as well as data that is associated with one or more user accounts for that client as recognized by the computing environment 8.

The data associated with a client may include, without limitation, demographic data (e.g., age, gender, income, location, etc.), preference data input by the client, and inferred data generated through machine learning, modeling, pattern matching, or other automated techniques. The client profile data may also include historical interactions and transactions associated with the tagging system 10 and/or financial institution system 16, e.g., login history, search history, communication logs, documents, etc.

It can be appreciated that the datastore for the tagged data 18 is shown separately from the tagging system 10 for illustrative purposes only and may also be at least partially stored within a database, memory, or portion thereof within the tagging system 10. It can also be appreciated that while the tagging system 10 and financial institution system 16 are shown as separate entities in FIG. 1, they may also be part of the same system. For example, the tagging system 10 can be hosted and provided within the financial institution system 16.

Client devices 12 may be associated with one or more users. Users may be referred to herein as customers, clients, correspondents, or other entities that interact with the financial institution system 16 and/or tagging system 10 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, the user may use client device 12 to engage and interface with a mobile or web-based banking application which uses or incorporates the tagging system 10 to assist in augmenting transaction entries with additional content as herein described. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, tagging system 10 may be one or more computer systems configured to process and store information and execute software instructions to perform one or more processes consistent with the disclosed embodiments. In certain embodiments, although not required, tagging system 10 may be associated with one or more business entities. In certain embodiments, tagging system 10 may represent or be part of any type of business entity. For example, tagging system 10 may be a system associated with a commercial bank (e.g., financial institution system 16), a retailer, or some other type of business. The tagging system 10 can also operate as a standalone entity that is configured to serve multiple business entities, e.g., to act as an agent therefor.

Referring back to FIG. 1, the tagging system 10 and/or financial institution system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the tagging system 10 and financial institution system 16. The cryptographic server may be used to protect the financial data 68 and/or transaction data 18 and/or tagged data 20 by way of encryption for data protection, digital signatures or message digests for data integrity, and by using digital certificates to authenticate the identity of the users and client devices 12 with which the financial institution system 16 and/or tagging system 10 communicates to inhibit data breaches by adversaries. It can be appreciated that various cryptographic mechanisms and protocols can be chosen and implemented to suit the constraints and requirements of the particular deployment of the tagging system 10 or financial institution system 16 as is known in the art.

Figure 2:
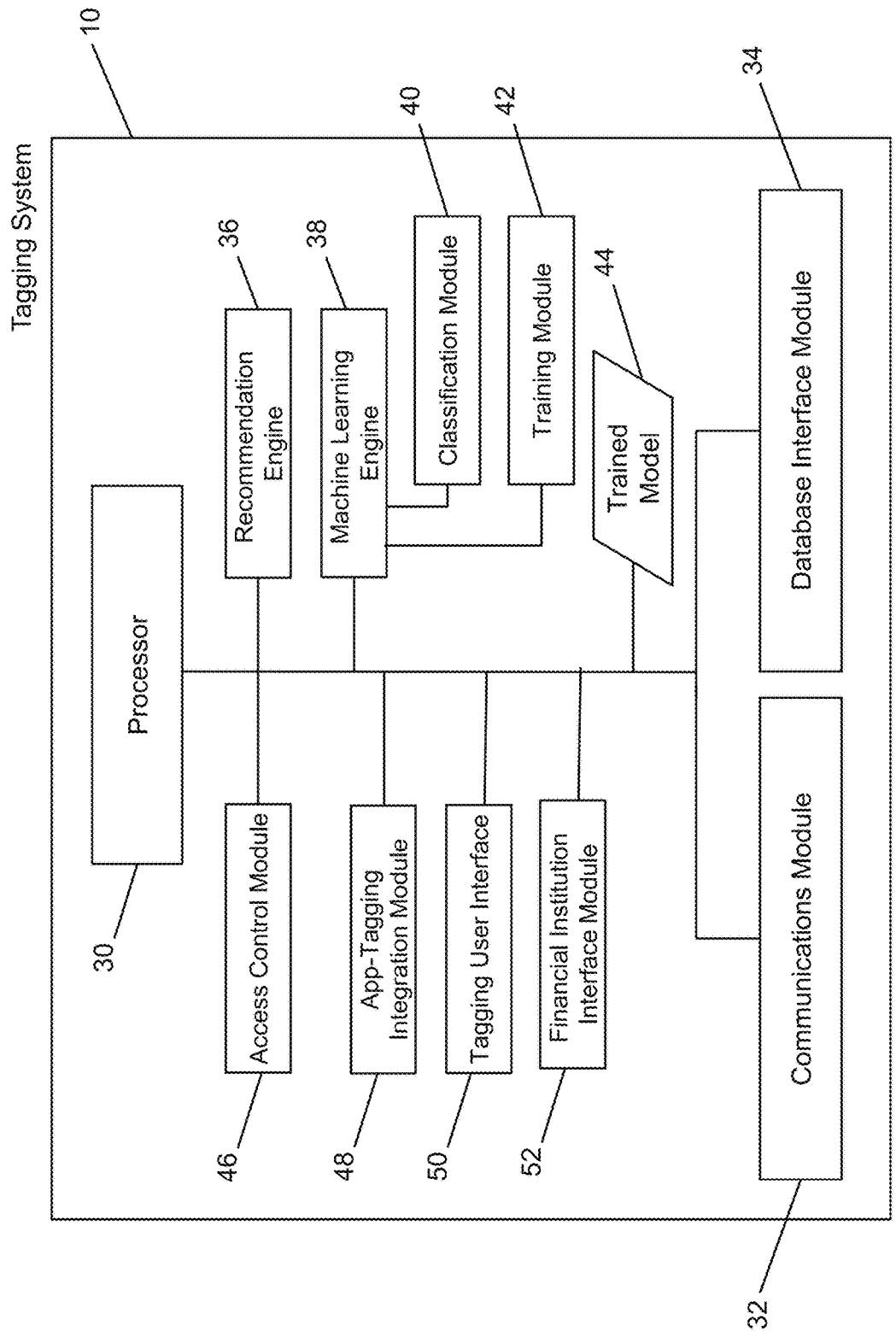
FIG. 2 is a block diagram of an example configuration of a tagging system.

In FIG. 2, an example configuration of the tagging system 10 is shown. In certain embodiments, the tagging system 10 may include one or more processors 30, a communications module 32, and a database interface module 34 for interfacing with the datastore of tagged data 20 (and if permitted transaction data 18) to retrieve, modify, and store (e.g., add) data. Communications module 32 enables the tagging system 10 to communicate with one or more other components of the computing environment 8, such as client device 12 (or one of its components), via a bus or other communication network, such as the communication network 14. While not delineated in FIG. 2, the tagging system 10 includes at least one memory or memory device that can include a tangible and non-transitory computer-readable medium having stored therein computer programs, sets of instructions, code, or data to be executed by processor 30. FIG. 2 illustrates examples of modules, tools and engines stored in memory on the tagging system 10 and operated by the processor 30. It can be appreciated that any of the modules, tools, and engines shown in FIG. 2 may also be hosted externally and be available to the tagging system 10, e.g., via the communications module 32. In the example embodiment shown in FIG. 2, the tagging system 10 includes a recommendation engine 36, a machine learning engine 38, a classification module 40, a training module 42, a trained model 44, an access control module 46, an app-tagging integration module 48, a tagging user interface 50, and a financial institution interface module 52.

The recommendation engine 36 is used by the tagging system 10 to generate one or more recommendations for a client device 12 that is/are related to an association between transactions or users or that is/are related to a "suggested" tag for a transaction for the user to add in an area or portion of an application such as a financial institution mobile or web application. It may be noted that a recommendation as used herein may refer to a prediction, suggestion, inference, association or other recommended identifier that can be used as a tag, based on information that is provided to or inferred from the content that is gathered and/or provided to the tagging system 10 and stored as tagged data 20. The recommendation engine 36 can access the tagged data 20 and, if permitted, the transaction data 18 (or other financial data 68) via the databases interface module 34 and apply one or more inference processes to generate the recommendation(s). The recommendation engine 36 may utilize or otherwise interface with the machine learning engine 38 to both classify data currently being analyzed to generate a suggestion or recommendation, and to train classifiers using data that is continually being processed and accumulated by the tagging system 10.

The machine learning engine 38 may also perform operations that classify the tagged data 20 in accordance with corresponding classifications parameters, e.g., based on an application of one or more machine learning algorithms to each of the groups of data 18, 20, 68 (also referred to herein as "user content", "tagged content", "user information" or "client information"). The machine learning algorithms may include, but are not limited to, a one-dimensional, convolutional neural network model (e.g., implemented using a corresponding neural network library, such as Keras®), and the one or more machine learning algorithms may be trained against, and adaptively improved, using elements of previously classified profile content identifying suitable matches between content identified and potential actions to be executed. Subsequent to classifying the profile content, the recommendation engine 36 may further process each element of the content to identify, and extract, a value characterizing the corresponding one of the classification parameters, e.g., based on an application of one or more additional machine learning algorithms to each of the elements of the profile or tagged content. By way of example, the additional machine learning algorithms may include, but are not limited to, an adaptive natural language processing algorithm that, among other things, predicts starting and ending indices of a candidate parameter value within each element of the content, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified content. Classification parameters may be stored and maintained using the classification module 40, and training data may be stored and maintained using the training module 42.

The trained model 44 may also be created, stored, refined, updated, re-trained, and referenced by the tagging system 10 and/or financial institution system 16 to determine associations between users, transactions, or content. Such associations can be used to generate "people like you" recommendations or suggestions for tagging data. The trained model 44 can also be used to enhance searching functions, e.g., within other parts of the financial institution system 16 such as searching tools used to locate information within a user's account. That is, the trained model 44 can be used in both searching and other functions or applications utilized or provided by the financial institution system 16. In one example, the trained model 44 may correspond to a Word2Vec-type model, which may represent a group of related models that are used to produce word embeddings, e.g., shallow, two-layer neural networks that are trained to reconstruct linguistic contexts of words. It can be appreciated that the trained model 44 can also include or correspond to other types of associative models that enable associations to be made between users, transactions, and other data.

In some instances, classification data stored in the classification module 40 may identify one or more parameters, e.g., "classification" parameters, that facilitate a classification of corresponding elements or groups of recognized content based on any of the exemplary machine learning algorithms or processes described herein. The one or more classification parameters may correspond to parameters that can indicate an affinity or compatibility between the data 18, 20, 68 and certain potential actions. For example, a transaction for a retailer could be associated with a "grocery" tag based on how other users tag that retailer. This can be useful for transactions that occur in an online marketplace or retailer that is not traditionally known as a "grocery store".

In some instances, the additional, or alternate, machine learning algorithms may include one or more adaptive, natural-language processing algorithms capable of parsing each of the classified portions of the profile content and predicting a starting and ending index of the candidate parameter value within each of the classified portions. Examples of the adaptive, natural-language processing algorithms include, but are not limited to, natural-language processing models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of tagged content (e.g., a value or type of data being augmented with a transaction) and a single classification parameter and additionally, or alternatively, multiple classification parameters.

Based on the output of the one or more machine learning algorithms or processes, such as the one-dimensional, convolutional neural network model described herein, machine learning engine 38 may perform operations that classify each of the discrete elements of tagged content as a corresponding one of the classification parameters, e.g., as obtained from classification data stored by the classification module 40.

The outputs of the machine learning algorithms or processes may then be used by the recommendation engine 36 to generate one or more suggested tags that can be presented to the user, either dynamically or as a predefined or predetermined tag that is available if/when a user chooses to tag a particular transaction entry.

Referring again to FIG. 2, the access control module 46 may be used to apply a hierarchy of permission levels or otherwise apply predetermined criteria to determine what transaction data 18, tagged data 20, or financial data 68 can be shared with which entity in the computing environment 8. For example, the tagging system 10 may have been granted access to certain sensitive transaction data 18 or financial data 68 for a user, which is associated with a certain client device 12 in the computing environment 8. Similarly, certain client profile data stored in the transaction data 18, tagged data 20, or financial data 68 may include potentially sensitive information such as age, date of birth, or nationality, which may not necessarily be needed by the tagging system 10 to execute certain actions. As such, the access control module 46 can be used to control the sharing of certain client profile data or other transaction data 18 and/or tagged data 20 and/or financial data 68 based on a type of client/user, a permission or preference, or any other restriction imposed by the computing environment 8 or application in which the tagging system 10 is used.

The tagging system 10 may also include an app-tagging integration module 48 that is provided to enable entities in the computing environment 8 to communicate with the tagging system 10, e.g., via an existing banking application or other application used by the client for interfacing with the financial institution system 16. The app-tagging integration module 48 can take the form of an application programming interface (API), software development kit (SDK) or any other software, plug-in, agent, or tool that allows the tagging system 10 to be integrated with or within an application associated with another entity. For example, the app-tagging integration module 48 can enable tagging functionality to be integrated into a financial institution application 90 (see FIG. 4) to enable users of the client devices 12 to augment their transaction histories with the financial institution system 16.

The tagging system 10 may also include a tagging user interface 50 that provides way for a user to obtain content from their client device 12 and provide such content to the tagging system 10 to be stored as tagged data 20. It can be appreciated that the app-tagging integration module 48 and tagging user interface 50 are shown separately in FIG. 2 for illustrative purposes and the functionality thereof could instead be integrated.

In this example embodiment, the tagging user interface 50 is integrated within the tagging system 10 to leverage the recommendation engine 36 and machine learning engine 38 to intelligently determine associations and generate suggested or recommended tags to be used by clients when interacting with an application provided by the financial institution system 16. The application can be a web-based application accessible through the client device 12 or an "app" residing on the client device 12, or any other platform or portal that effectively provides the same functionality, collectively referred to herein as an "application" having a list, log, or other series of entries such as a transaction history as exemplified herein.

Figure 3:
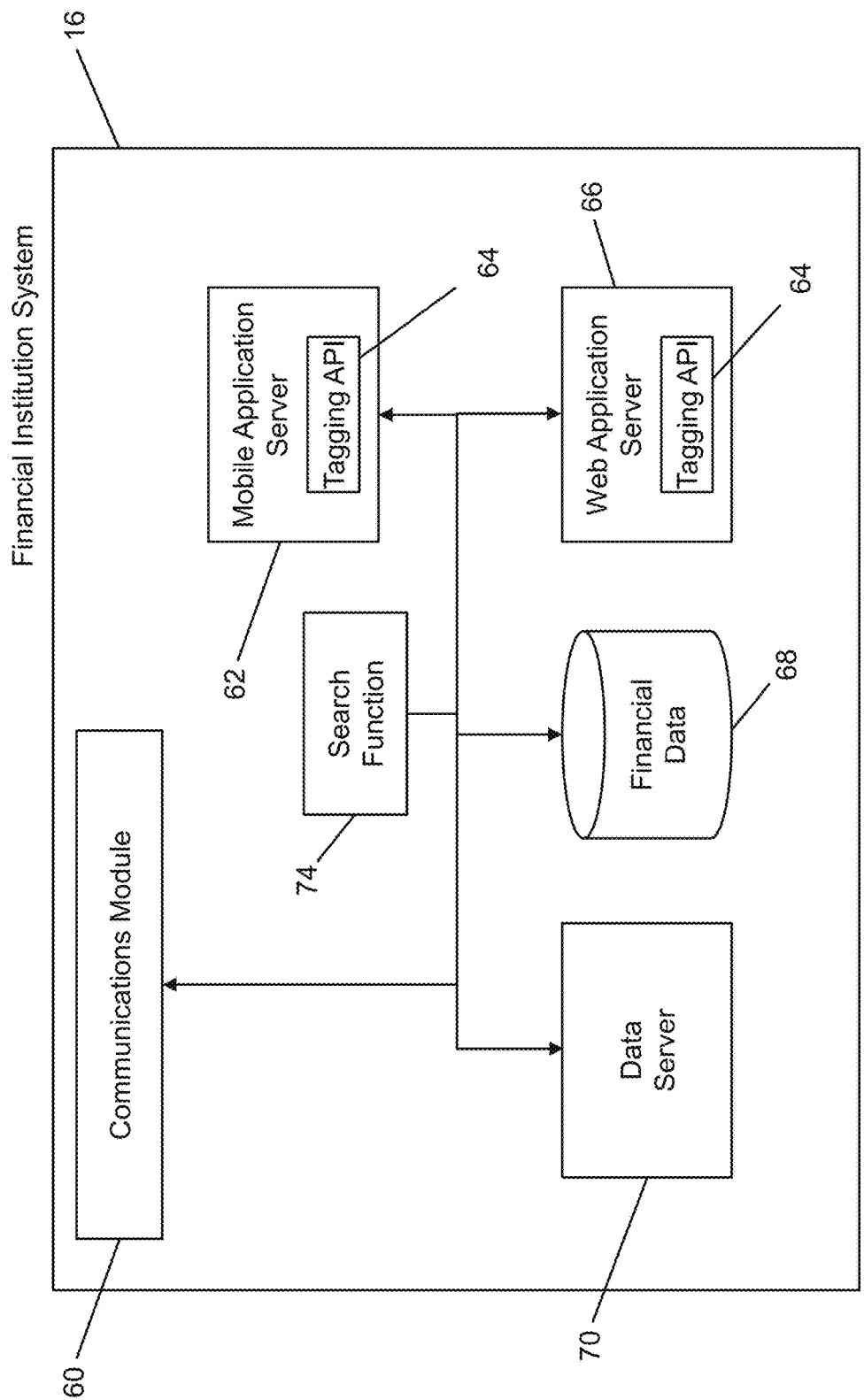
FIG. 3 is a block diagram of an example configuration of a financial institution system.

The tagging system 10 may also include a financial institution interface module 52 to provide a graphical user interface (GUI) or API connectivity to communicate with the financial institution system 16 to obtain transaction data 20 and financial data 68 for a certain user (see FIG. 3). It can be appreciated that the financial institution interface module 52 may also provide a web browser-based interface, an application or "app" interface, a machine language interface, etc.

In FIG. 3, an example configuration of the financial institution system 16 is shown. The financial institution system 16 includes a communications module 60 that enables the financial institution system 16 to communicate with one or more other components of the computing environment 8, such as client device 12 (or one of its components) or tagging system 10, via a bus or other communication network, such as the communication network 14. While not delineated in FIG. 3, the system 16 includes at least one memory or memory device that can include a tangible and non-transitory computer-readable medium having stored therein computer programs, sets of instructions, code, or data to be executed by one or more processors (not shown for clarity of illustration). FIG. 3 illustrates examples of servers and datastores/databases operable within the system 16. It can be appreciated that any of the components shown in FIG. 3 may also be hosted externally and be available to the system 16, e.g., via the communications module 60. In the example embodiment shown in FIG. 3, the financial institution system 16 includes one or more servers to provide access to the transaction data 18 (which may be included in the financial data 68 or stored separately as shown in FIG. 1) to the tagging system 10 to enable the tagging system 10 to enable tags to be created and for tags to be suggested or recommended to the user. Exemplary servers include a mobile application server 62, a web server 66 and a data server 70. Although not shown in FIG. 3, as noted above, the system 16 may also include a cryptographic server for performing cryptographic operations and providing cryptographic services. The cryptographic server can also be configured to communicate and operate with a cryptographic infrastructure. The system 16 may also include one or more data storages for storing and providing data for use in such services, such as data storage for storing financial data 68.

Mobile application server 62 supports interactions with a mobile application installed on client device 12. Mobile application server 62 can access other resources of the financial institution system 16 to carry out requests made by, and to provide content and data to, a mobile application on client device 12. In certain example embodiments, mobile application server 62 supports a mobile banking application to provide payments from one or more accounts of user, among other things. As shown in FIG. 3, the mobile application server 62 can include a tagging API 64 which enables the mobile application to integrate or otherwise coordinate or work with the tagging system 10 to provide a tagging functionality. For example, the tagging API 64 can communicate with the tagging system 10 via the app-tagging integration module 48 in the tagging system 10 (see FIG. 2). This allows, for example, a user to add content and tag such content to transactions or other events or actions.

Web application server 66 supports interactions using a website accessed by a web browser application 92 (see FIG. 4) running on the client device 12. It can be appreciated that the mobile application server 62 and the web application server 66 can provide different front ends for the same application, that is, the mobile (app) and web (browser) versions of the same application. For example, the financial institution system 16 may provide a banking application that be accessed via a smartphone or tablet app while also being accessible via a browser on any browser-enabled device. As shown in FIG. 3, the web application server 66 may also include a tagging API 64 to enable the web application to integrate or otherwise coordinate or work with the tagging system 10 to provide tagging functionality.

The financial data 68 may be associated with users of the client devices 12 (e.g., customers of the financial institution). The financial data 18 may include any data related to or derived from financial values or metrics associated with customers of the financial institution system 16, for example, account balances, transaction histories, line of credit available, credit scores, mortgage balances, affordability metrics, investment account balances, investment values and types, among many others. Other metrics can be associated with the financial data 68, such as financial health data that is indicative of the financial health of the users of the client devices 12. As indicated above, it can be appreciated that the transaction data 18 shown in FIG. 1 may be part of the financial data 68 held by the financial institution system 16 and is shown separately for ease of illustration and ease of reference herein.

The search function 74 is an example of a module, function, service, tool or option provided with in the financial institution system 16 that may be used by one or more of the servers 62, 66, 70 to enable users and/or administrators to perform searching functions. For example, the search function 74 can be utilized by a mobile or web-based banking application to allow a user to search through their transactions to locate and/or organize data. The search function 74 can also be used by internal administrative tools, e.g., for financial auditing and reporting, for searching client data. The search function 74 can benefit from the results of analyses performed by the tagging system 10 and/or other features within or used by the financial institution system 16. For example, the search function 74 can have access to the tagged data 20 to assist in locating appropriate content from the transaction data 18 or financial data 68 when conducting keyword searches.

Figure 4:
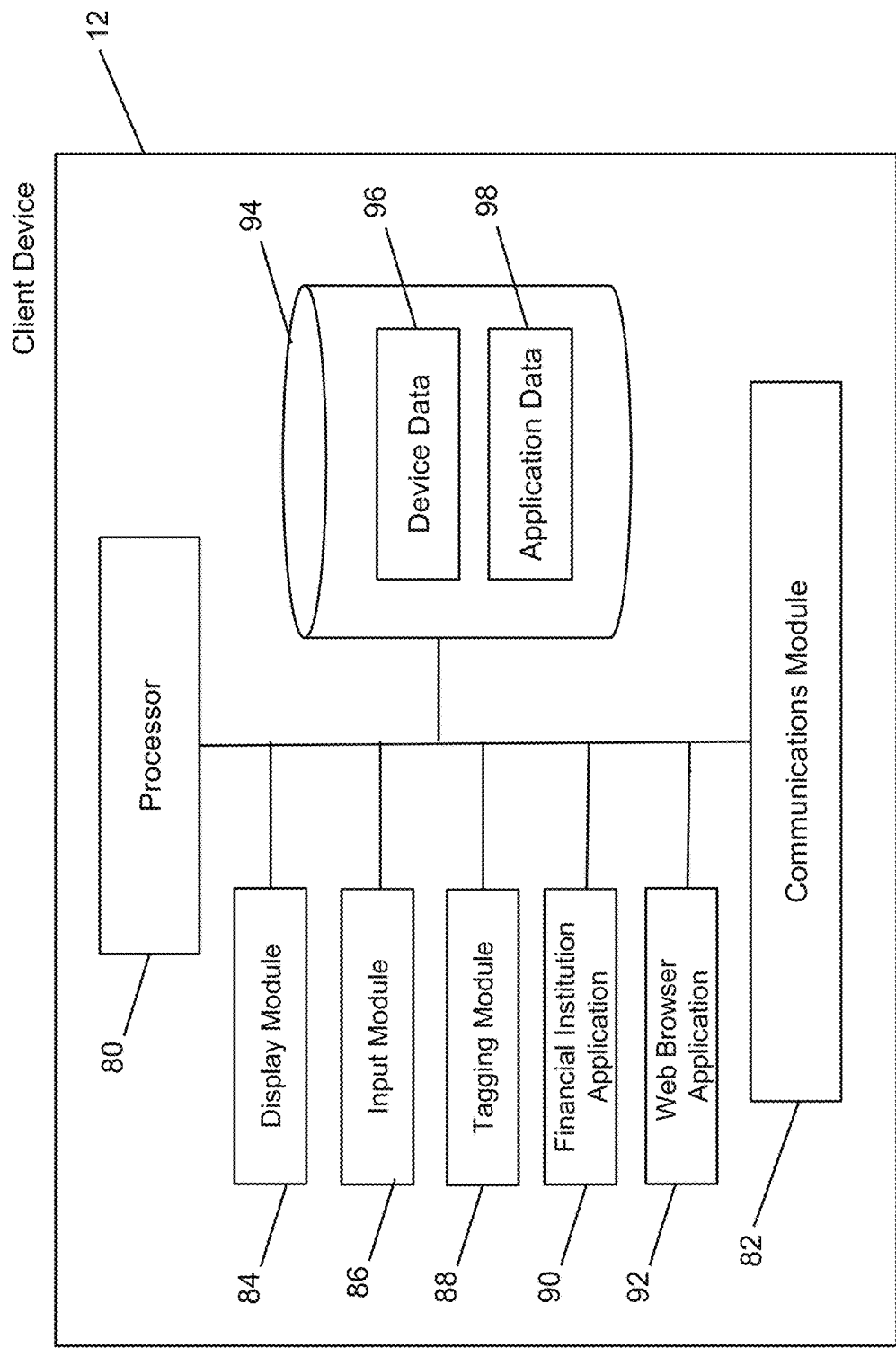
FIG. 4 is a block diagram of an example configuration of a client computing device associated with a user, customer, or client.

In FIG. 4, an example configuration of the client device 12 is shown. In certain embodiments, the client device 12 may include one or more processors 80, a communications module 82, and a data store 94 storing device data 96 and application data 98. Communications module 82 enables the client device 12 to communicate with one or more other components of the computing environment 8, such as tagging system 10 or financial institution system 16, via a bus or other communication network, such as the communication network 14. While not delineated in FIG. 4, the client device 12 includes at least one memory or memory device that can include a tangible and non-transitory computer-readable medium having stored therein computer programs, sets of instructions, code, or data to be executed by processor 80. FIG. 4 illustrates examples of modules and applications stored in memory on the client device 12 and operated by the processor 80. It can be appreciated that any of the modules and applications shown in FIG. 4 may also be hosted externally and be available to the client device 12, e.g., via the communications module 82.

In the example embodiment shown in FIG. 4, the client device 12 includes a display module 84 for rendering GUIs and other visual outputs on a display device such as a display screen, and an input module 86 for processing user or other inputs received at the client device 12, e.g., via a touch-screen, input button, transceiver, microphone, keyboard, etc. The client device 12 may also include a tagging module 88, which may take the form of a customized app, plug-in, widget, or software component provided by the tagging system 10 for use by the client device 12 to tag content and thus contribute to the tagged data 20 handled by the tagging system 10. As indicated above, such a tagging functionality can be a stand-alone application or be a page, tab or portion of another application such as a mobile banking application. The tagging module 88 may also be navigable to/from such an application. Similarly, the client device 12 may include a financial institution application 90 provided by their financial institution system 16, e.g., for performing mobile banking operations. The client device 12 in this example embodiment also includes a web browser application 92 for accessing Internet-based content, e.g., via a mobile or traditional website. The data store 94 may be used to store device data 96, such as, but not limited to, an IP address or a MAC address that uniquely identifies client device 12 within environment 8. The data store 94 may also be used to store application data 98, such as, but not limited to, login credentials, user preferences, cryptographic data (e.g., cryptographic keys), etc.

It will be appreciated that only certain modules, applications, tools and engines are shown in FIGS. 2 to 4 for ease of illustration and various other components would be provided and utilized by the tagging system 10, financial institution system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in tagging system 10 or financial institution system 16, or client device 12, or accessible or connectable thereto. Any application or module herein described may be implemented using computer readable/executable instructions that may be stored or otherwise held by such computer readable media.

Figure 5:
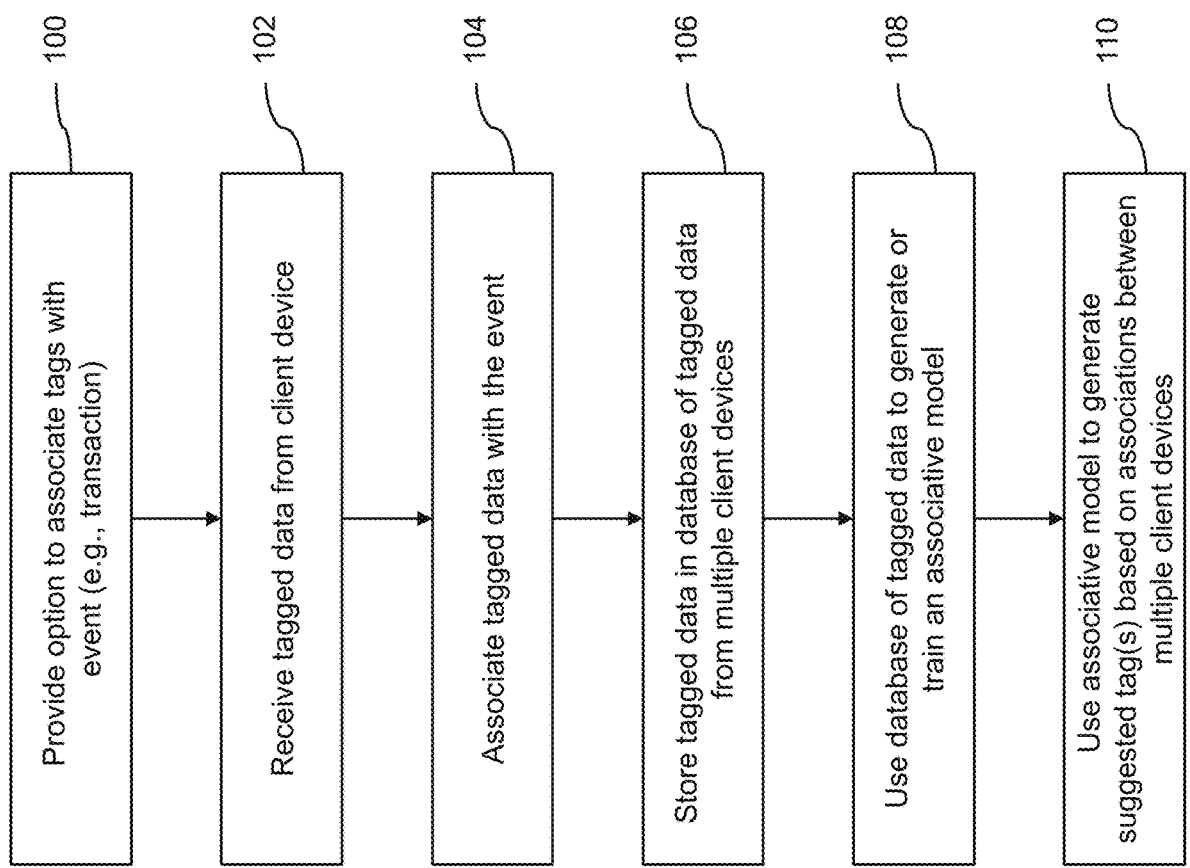
FIG. 5 is a flow diagram of an example of computer executable instructions for tagging data.

Referring to FIG. 5, an example embodiment of computer executable instructions for tagging data is shown. At block 100, the financial institution system 16, or the tagging system 10 on behalf of the financial institution system 16, provides an option to associate tags with events, such as transaction entries in a transaction history. This may be done through a graphical user interface in the financial institution application 90. At block 102 the tagging system 10 receives tagged data from at least one client device 12. The tagged data may include any content that was added or otherwise associated with the transaction by the user at the client device 12. For example, the tagging module 88 on the client device 12 may interact with the financial institution application 90 to obtain copies of, or links to, content that was associated with a transaction and provide the content to the tagging system 10. The tagging system 10 may then, at block 104, associate the tagged data with the event (i.e. transaction in this example). This may include preparing a mapping between the transaction data 18 and the tagged data 20. The tagging system 10 may then, at block 106, stored the tagged data in the database of tagged data 20. It can be appreciated that the tagged data 20 may include content received from multiple, and ideally many, client devices 12 to enable the tagging system 10 to use the tagged data 20 to generate or train an associative model at block 108 (i.e. the trained model 44). The trained model 44 can be stored and subsequently used at block 110 to generate suggested tags based on associations between multiple ones of the client devices 12. That is, by collecting tagged data 20 from multiple client devices 12 and generating and updating the trained model 44, the tagging system 10 can enhance subsequent tagging operations, e.g., by providing suggested tags based on what "people like you" have tagged.

Turning now to FIG. 6, an example of a GUI for the financial institution application 90 is shown. In FIG. 6, a My Accounts page 120 is being displayed. The My Accounts page 120 lists the accounts that the user has with the financial institution system 16, in this case, a chequing account, a savings account, a line of credit account, and a credit card account. By selecting an account entry 122, in this case the entry 122 for the credit card, an account summary page 124 may be displayed as shown in FIG. 7. The account summary page 124 includes a number of options 126 for completing actions in association with the credit card, and portion that provides multiple tabs. In FIG. 7 an activity tab 128 is being displayed, which lists a number of transactions, each with a transaction entry 130.

Figure 8:
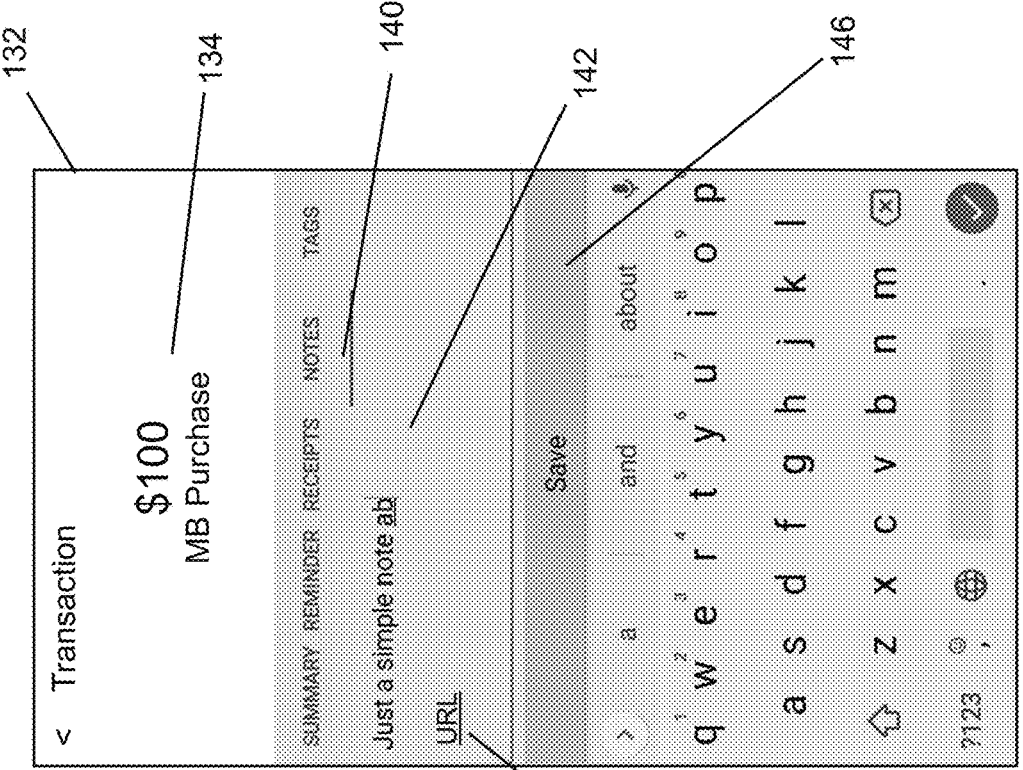
FIG. 8 is an example of a graphical user interface for a transaction details page of a financial institution application.

By selecting a transaction entry 130, in this case for "MP Purchase" of $100, a transaction details page 132 may be displayed as shown in FIG. 8. In the example shown in FIG. 8, the transaction details page 132 includes an identifier 134 (with amount), and some basic information 136 associated with the transaction, such as the date the transaction occurred, the date on which the transaction was posted to the financial institution system 16, and the account/card number. The transaction details page 132 may also include a number of tabs associated with the transaction. In this example, the summary tab 138 is being displayed. Other tabs may include a reminder tab to associate the transaction with a calendar, a receipts tab for associating a transaction receipt with the transaction, a notes tab 140 (see FIG. 9 discussed below), and a tags tab 150 (see FIG. 10 discussed below).

Figure 9:
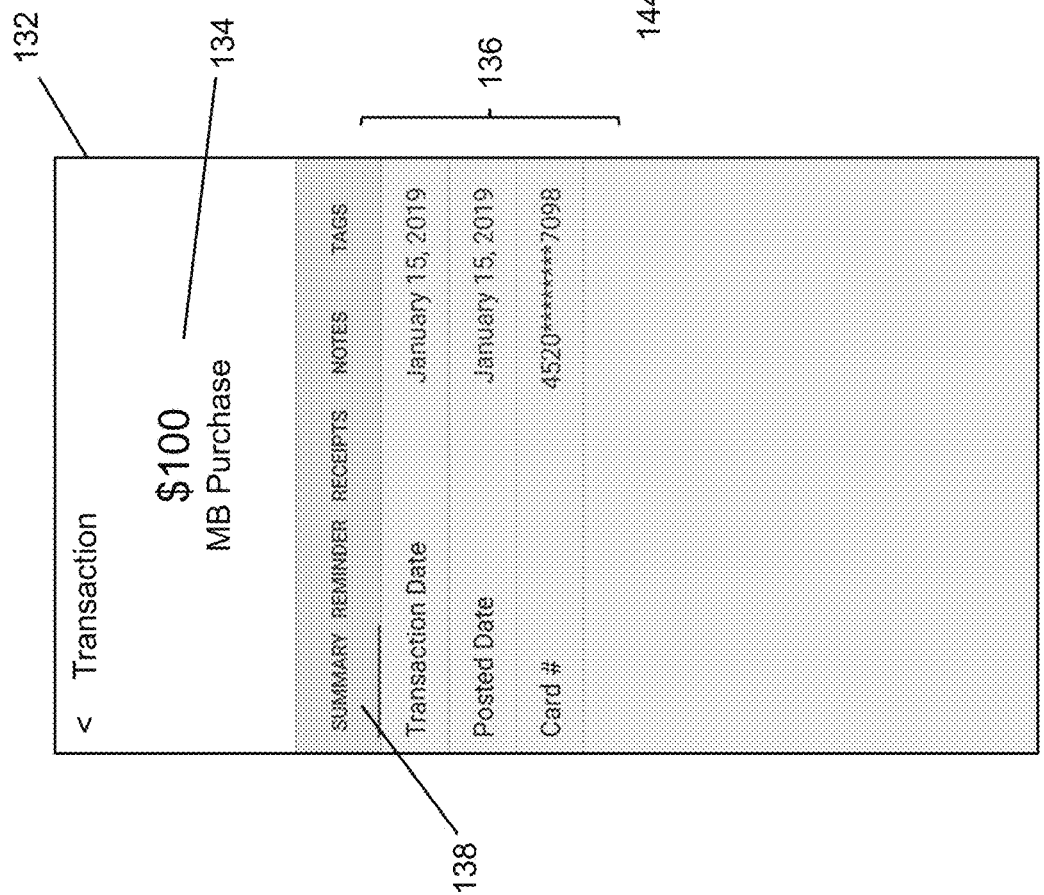
FIG. 9 is an example of a graphical user interface for a transaction details page of a financial institution application showing a notes tab.

FIG. 9 is an example of the transaction details page 132 with the notes tab 140 having been selected. The notes tab 140 may include a text entry field 142 that allows the user to augment the transaction information with content that can be used to associate the transaction with some other context. As shown in FIG. 9, the field 142 can enable the user to add linked data 144 such as a URL to web-based content. It can be appreciated that other content can be added, such as images, files, etc. By selecting a Save option 146, the content entered in the field 142 can be provided to and stored by the tagging system 10.

Figure 10:
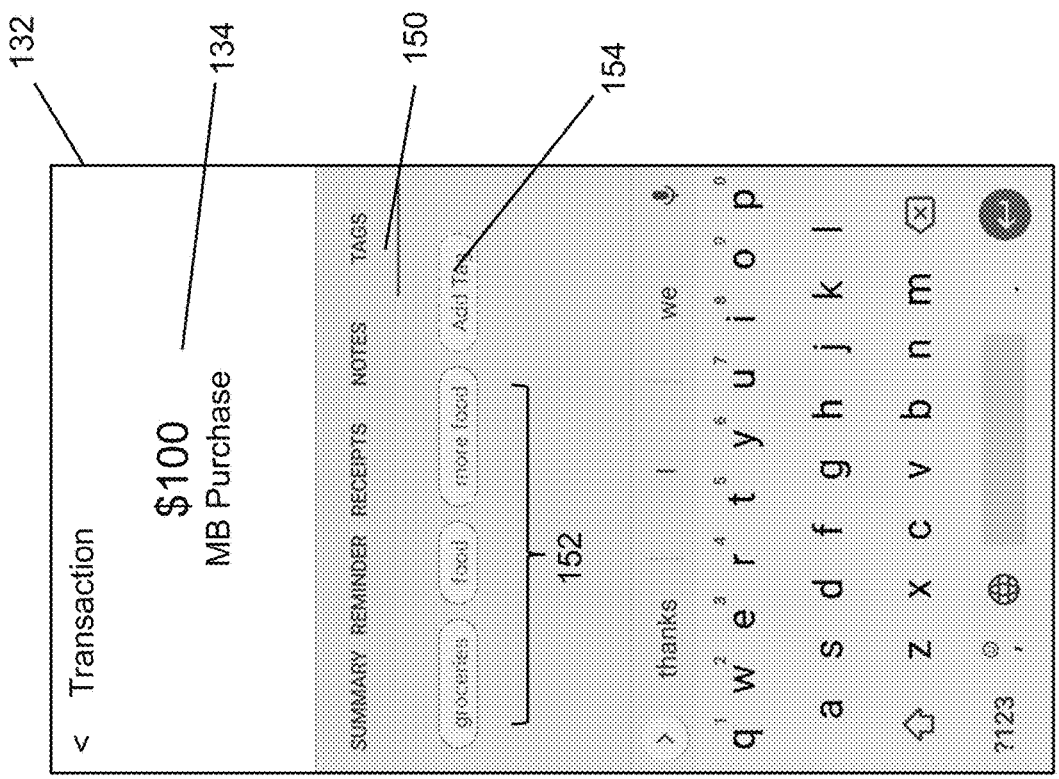
FIG. 10 is an example of a graphical user interface for a transaction details page of a financial institution application showing a tags tab with an option to create a tag.

FIG. 10 is an example of the transaction details page 132 with the tags tab 150 having been selected. In this example, a number of predetermined tags 152 are displayed for the user. It can be appreciated that the user can be prompted to accept the predetermined tags 152 and can be given the option to remove the tags if they are not appropriate for that particular transaction. Such predetermined tags 152 can include or otherwise be considered suggested or recommended tags prepared by the tagging system 10 based on the trained model 44 and data input to that model 44. The predetermined tags 152 can also include default tags that are not necessarily chosen using the model 44 or an analysis of the tagged data 20.

Figure 11:
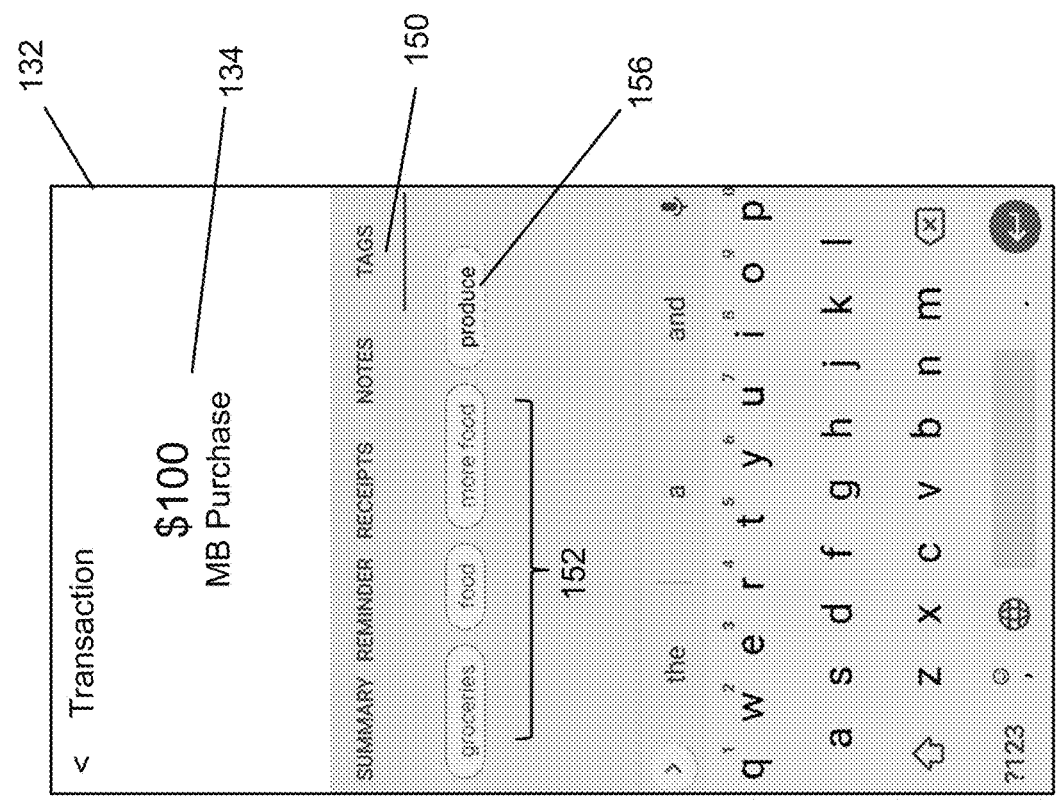
FIG. 11 is an example of a graphical user interface for a transaction details page of a financial institution application showing a tags tab with a user-created tag.

FIG. 10 also illustrates an Add Tag option 154, which when selected allows the user to define their own tag. As shown in FIG. 11, the user in this example creates the custom tag 156 "Produce" to supplement the predetermined tags 152 "Groceries", "Food", and "More food". The custom tag 156 can provide additional insight and context with respect to a purchase and when captured by the tagging system 10 can be used to further improve the associative trained model 44 for subsequently generating suggested tags for that user or users of other client devices 12.

Figure 12:
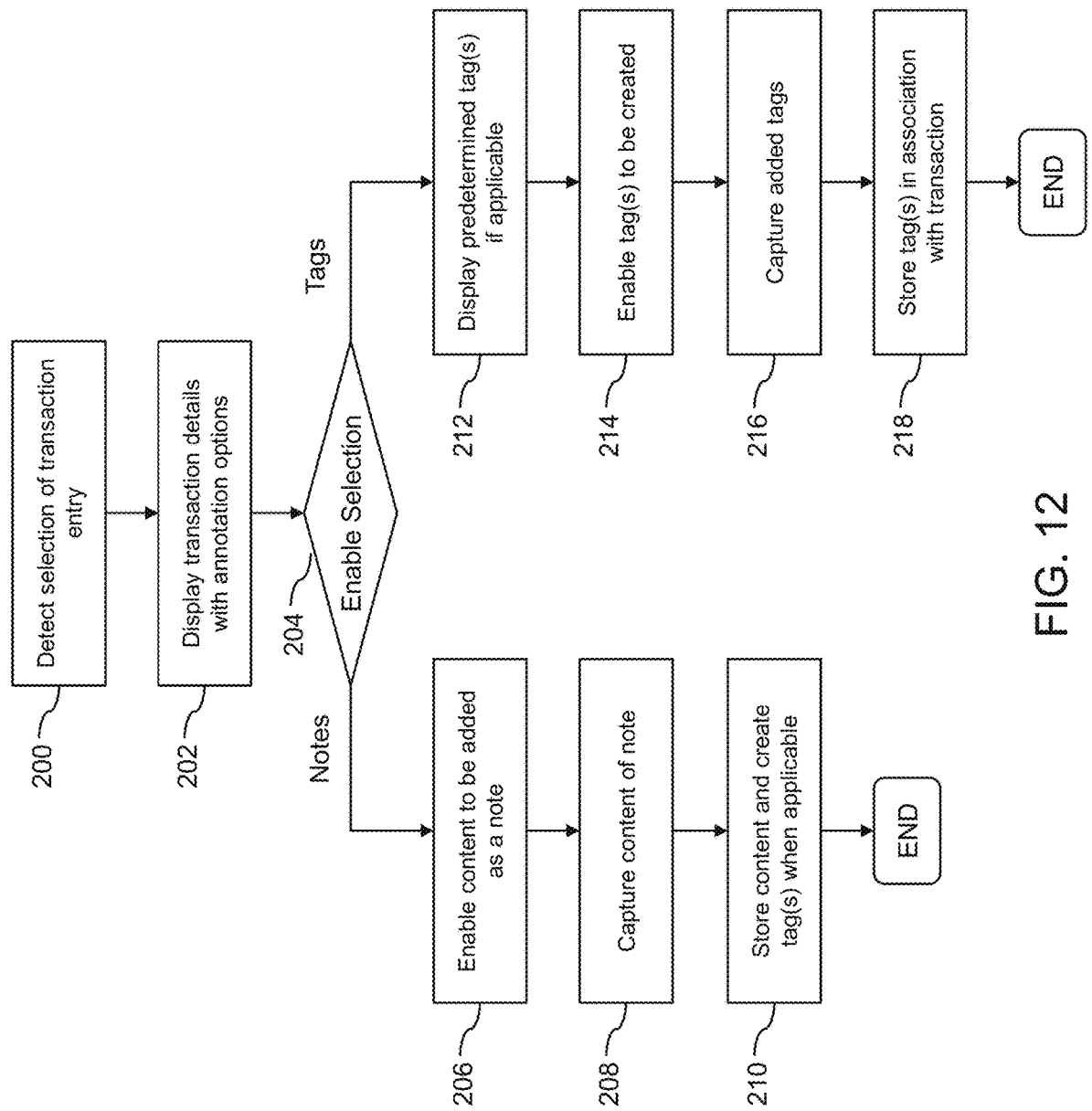
FIG. 12 is a flow diagram of an example of computer executable instructions for adding content to a transaction entry through notes and/or tags.

Referring to FIG. 12, an example embodiment of computer executable instructions for adding content to a transaction is shown. At block 200, the financial institution application 90 detects selection of a transaction entry 130, e.g., as shown in FIG. 7. At block 202, the financial institution application 90 displays transaction details with annotation options, e.g., as shown in FIG. 8. Continuing with the example above, the annotation options may include both a notes tab 140 and a tags tab 150. At block 204 the financial institution application 90 enables selection of these options.

When the user selects the notes tab 140, in this example, the financial institution application 90 enables content to be added as a note at block 206, e.g., as shown in FIG. 9. At block 208, the tagging system 10 captures the content(s) of the note, e.g., via the tagging module 88 and the app-tagging integration module 48. At block 210, the tagging system 10 stores the content with other tagged data 20. As indicated in FIG. 12, the tagging system 10 can also create one or more tags from the content obtained from the notes. In one example embodiment, techniques such as natural language processing can be used to extract keywords from a textual note to create a tag. For example, the user may compose a note with the following text: "This is when I bought groceries from Walmart". From this phrase, the keywords "groceries" and "Walmart" can be extracted and added as tags. The results of such an analysis may also be used to further train the associative model 44, e.g., such that transactions at Walmart could include groceries (rather than only other retail items).

When the user selects the tags tab 150, in this example, the financial institution application 90 displays predetermined tags 152 (if applicable) at block 212, and enables tags to be created at block 214, e.g., as shown in FIGS. 10 and 11. At block 216 the tagging system 10 captures the added tags 152, 154, e.g., via the tagging module 88 and the app-tagging integration module 48. At block 218, the tagging system 10 stores the tags in association with the transaction, e.g., by creating a mapping between the tagged data 20 and the transaction data 18.

With tagged data 20 acquired from multiple (e.g. many) client devices 12 as shown in FIG. 12, the tagging system 10 can generate the trained model 44, refine or retrain the trained model 44 or generate one or more new associative models between the transaction data 18 and the tagged data 20. In this way, new suggested tags can be created for subsequent tagging operations. Additionally, the search function 74 can be enhanced by providing access to the tagged data 20 and/or the trained model 44, e.g., via the app-tagging integration module 48 or the financial institution interface module 52. That is, the tagging system 10 can be leveraged by the financial institution system 16 for not only tagging operations, but to facilitate and improve searching capabilities within the financial institution system 16.

Figure 13:
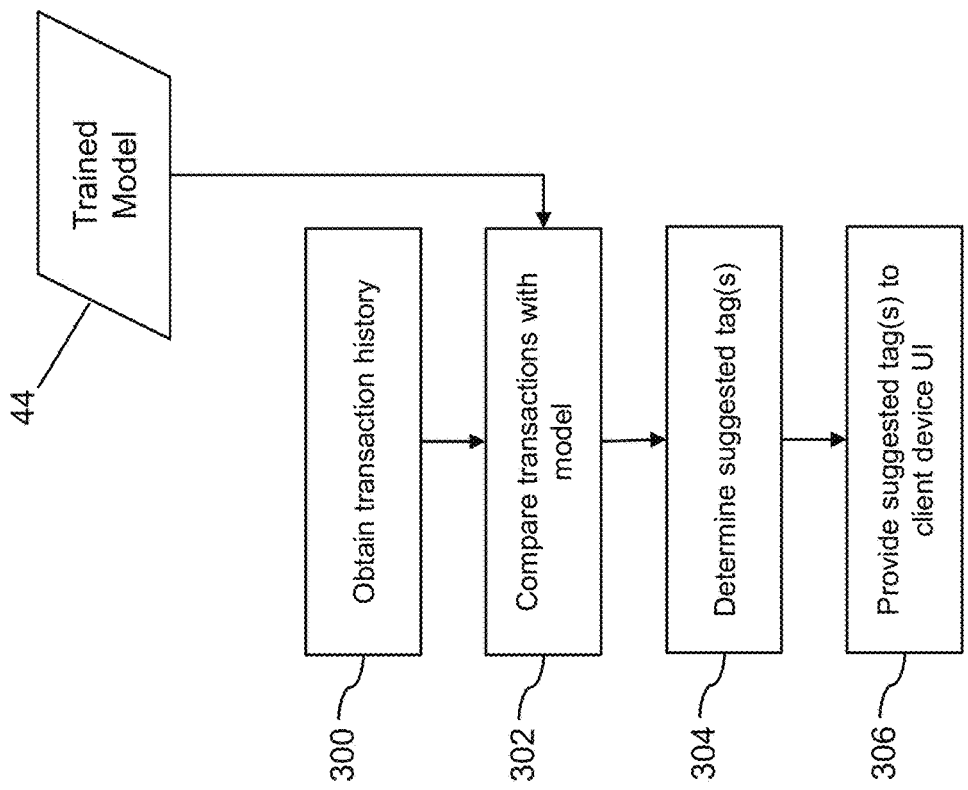
FIG. 13 is a flow diagram of an example of computer executable instructions for generating a suggested tag.

Referring now to FIG. 13, an example embodiment of computer executable instructions for generating a suggested tag is shown. At block 300, the tagging system 10 obtains a transaction history, e.g., by being provided access to the transaction data 18. At block 302, the tagging system 10 uses the recommendation engine 36 to compare the transaction entries with the trained model 44. At block 304, the tagging system 10 determines one or more suggested tags based on one or more associations determined from the comparison. At bock 306, the tagging system 10 can provide the one or more suggested tags to the client device user interface, e.g., the financial institution application 90. This can be done via the tagging module 88 and the app-tagging integration module 48 in this example. In this way, the tagging system 10 can be leveraged to preemptively determine suitable tags for the transaction entries 130, such that when the user selects the tags tab 150, the suggested tags are presented as predetermined tags 152.

Figure 14:
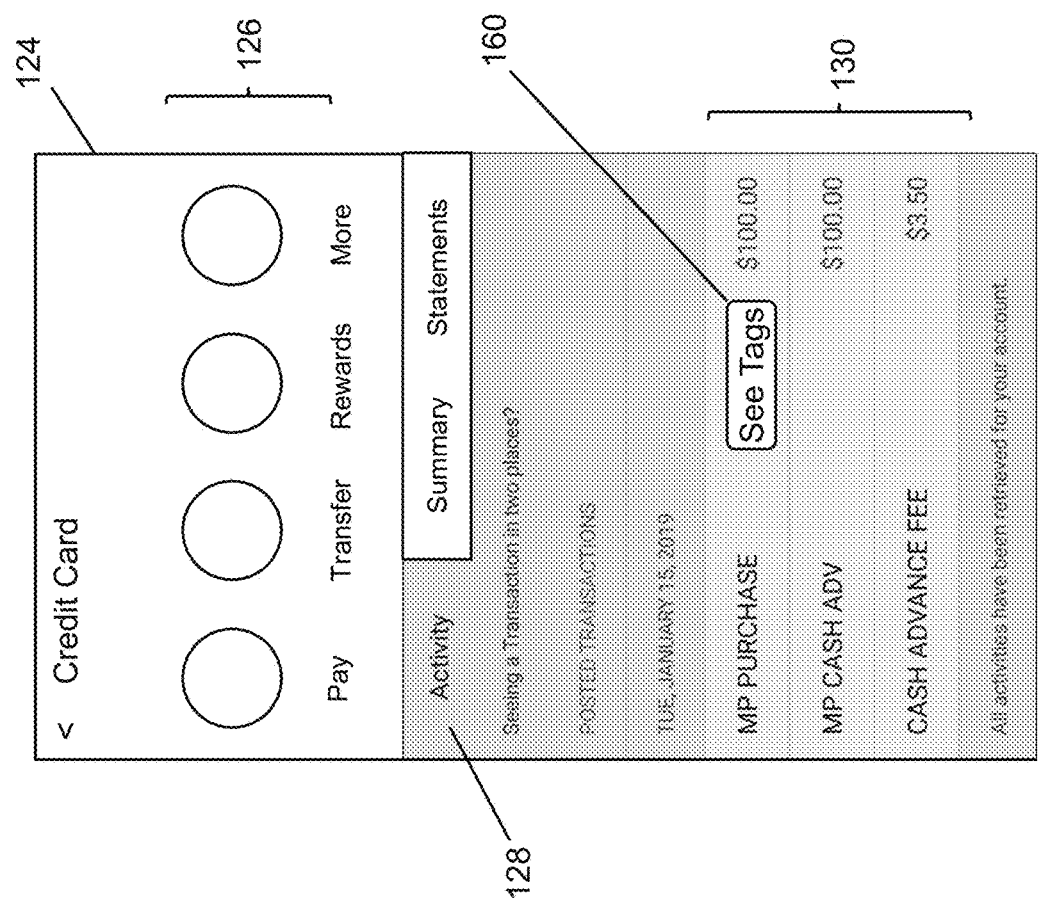
FIG. 14 is an example of a graphical user interface for an account details page of a financial institution application showing a tag notification in association with a transaction entry.

As shown in FIG. 14, the account summary page 124 that displays the transaction entries 130 can also be updated with tag notifications 160 to alert the user of the existence of such suggested or recommended tags. It can be appreciated that the tag notification 160 may also be used to entice the user to enter the transaction details page 132 to enter content, select or create tags, etc. That is, the notifications 160 may be used to encourage collection of additional content for the tagging system 10, which can lead to more data and a more accurate trained model 44.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A server device for tagging data, the server device comprising:
a processor;
a communications module coupled to the processor; and
a memory coupled to the processor, the memory storing computer executable instructions that when executed by the processor cause the processor to:
store tagged data received from a plurality of remote client devices in a database of tagged data, the database of tagged data being associated with a plurality of events;
use the database of tagged data to train an associative model;
make the trained associative model available to a searching function, used by a first application, to interact with the database of tagged data; and
make the searching function available to a second application, separate from the first application, wherein the second application is restricted from accessing the database of tagged data.

2. The server device of claim 1, wherein the computer executable instructions further cause the processor to:
provide, via the communications module, to another remote client device or to one of the plurality of remote client devices, at least one suggested tag generated by the trained associative model for use with an option to associate tags.

3. The server device of claim 2, wherein one or more of the at least one suggested tag indicates that users like a user of the other remote client device has tagged similar events using the suggested tag.

4. The server device of claim 1, wherein the first application includes an option to associate tags with a new event, and the option displays a plurality of existing tags on a display screen of the remote client device.

5. The server device of claim 4, wherein at least one of the plurality of existing tags is a suggested tag generated by the trained associative model.

6. The server device of claim 1, wherein the computer executable instructions further cause the processor to:
use the trained associative model to generate, and provide to the first application, at least one suggested tag based on associations between the plurality of client devices; and
use the searching function with the second application to search another set of data that is not the database of tagged data.

7. The server device of claim 1, wherein the searching function is used by the first application to display information associated with events.

8. The server device of claim 1, wherein the second application is implemented on another remote client device or one of the plurality of remote client devices.

9. The server device of claim 1, wherein the computer executable instructions further cause the processor to:
further train the associative model using data associated with a new event.

10. The server device of claim 9, wherein the data associated with the new event is obtained from at least one of: an existing event description, and a user-generated association generated through use of an option enabling a tag to be selected, created, or customized to add context to the new event.

11. The server device of claim 9, wherein the data associated with the event is obtained from a transaction receipt.

12. The server device of claim 1, wherein training the associative model comprises building a group of related models that are used to produce word embeddings.

13. A method of tagging data, the method executed by a device having a communications module and comprising:
storing tagged data received from a plurality of remote client devices in a database of tagged data, the database of tagged data being associated with a plurality of events;
using the database of tagged data to generate or train an associative model;
making the trained associative model available to a searching function of a first application, to interact with the database of tagged data; and
making the searching function available to a second application, separate from the first application, wherein the second application is restricted from accessing the database of tagged data.

14. The method of claim 13, further comprising:
providing via the communications module to the remote client device or another remote client device, at least one suggested tag generated by the trained associative model for use with an option to associate tags.

15. The method of claim 13, further comprising:
training the associative model using data associated with a new event.

16. The method of claim 13, wherein training the associative model comprises building a group of related models that are used to produce word embeddings.

17. The method of claim 13, further comprising:
updating the searching function; and
providing the second application access to the updated searching function.

18. The method of claim 13, further comprising:
using the trained associative model to generate, and provide to the first application, at least one suggested tag based on associations between the plurality of client devices; and
using the searching function with the second application to search another set of data that is not the database of tagged data.

19. The method of claim 13, wherein the second application is implemented on the remote client device or another remote client device.

20. A non-transitory computer readable medium for tagging data, the computer readable medium comprising computer executable instructions for:
storing tagged data received from a plurality of remote client devices in a database of tagged data, the database of tagged data being associated with a plurality of events;
using the database of tagged data to train an associative model;
making the trained associative model available to a searching function of a first application, to interact with the database of tagged data;
making the searching function available to a second application, separate from the first application, wherein the second application is restricted from accessing the database of tagged data.

* * * * *